United States Patent [19]
Williams

[11] 4,001,452
[45] Jan. 4, 1977

[54] METHOD OF PREPARING ANIMAL FOOD PELLETS

[75] Inventor: Merl A. Williams, Craigville, Ind.

[73] Assignee: Central Soya Company, Inc., Fort Wayne, Ind.

[22] Filed: Sept. 10, 1975

[21] Appl. No.: 612,242

[52] U.S. Cl. .............................. 426/454; 264/141; 264/148; 426/516; 426/517; 426/805; 426/807

[51] Int. Cl.² ..................... A23L 1/01; A23K 1/00; B29C 23/00

[58] Field of Search ................. 264/140, 141, 148; 426/448, 449, 454, 516, 518, 520, 805, 517, 807, 510, 463; 425/307

[56] References Cited
UNITED STATES PATENTS

| | | | |
|---|---|---|---|
| 3,117,006 | 1/1964 | Wenger | 426/448 |
| 3,365,297 | 1/1968 | Burgess et al. | 425/805 |
| 3,438,780 | 4/1969 | Singer | 425/805 |
| 3,458,321 | 7/1969 | Reinhart et al. | 426/448 |
| 3,642,406 | 2/1972 | Irving | 425/307 |

*Primary Examiner*—W. E. Hoag
*Attorney, Agent, or Firm*—Tilton, Fallon, Lungmus, Chestnut & Hill

[57] ABSTRACT

A method of preparing animal food pellets wherein cooked mash under atmospheric pressure is forced through a die wherein the mash has been cooked under superatmospheric pressure.

2 Claims, 4 Drawing Figures

U.S. Patent  Jan. 4, 1977  4,001,452
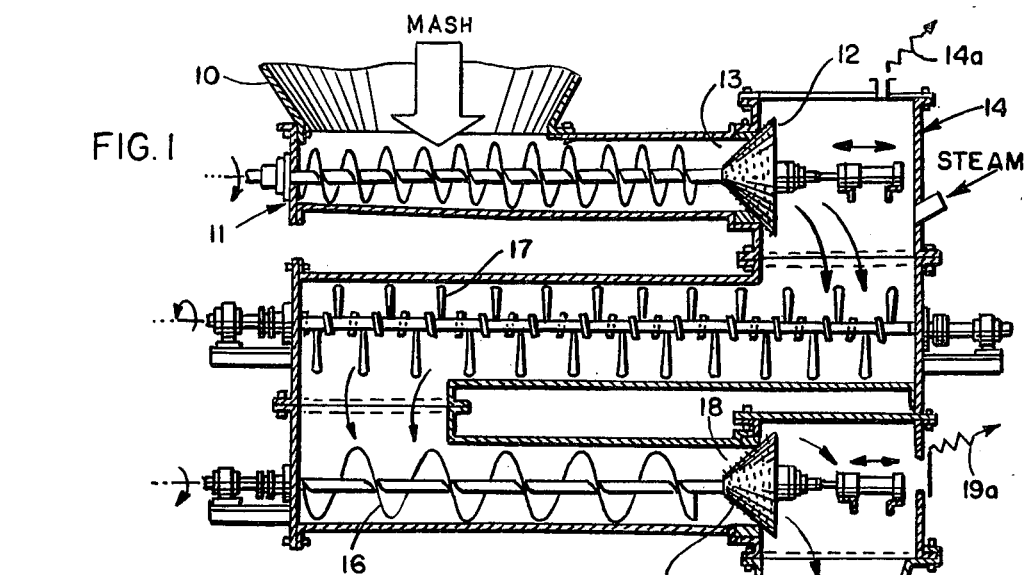
FIG. 1
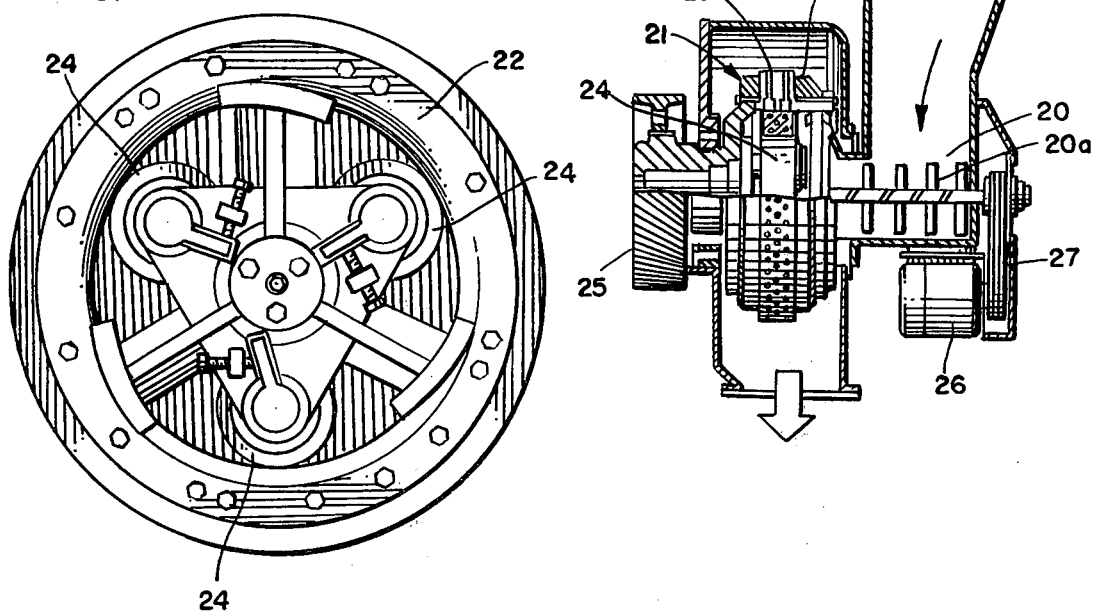
FIG. 2
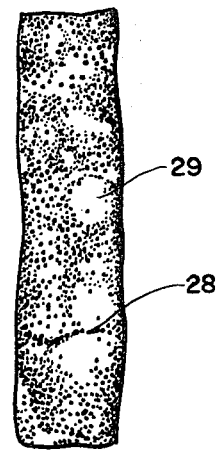
FIG. 3 (PRIOR ART)
FIG. 4 (INVENTION)

METHOD OF PREPARING ANIMAL FOOD PELLETS

BACKGROUND AND SUMMARY OF INVENTION

This invention relates to a method of preparing animal feed pellets and, more particularly, to a method employing a unique pressure cooking step for the mash which becomes the animal food pellets. For many years, various cereal grains, plant and animal proteins, roughage products, liquids, and other miscellaneous ingredients have been mixed together to form a mash which was relatively aerated. The mash normally has been fed from a bin holding the bulk mash through a variable screw feeder to an atmospheric conditioner or cooker. Because of the different ingredients and the amounts thereof in various formulas of animal food, different rates of mash introduction and different amounts of moisture addition were required. Further, when the pelleting mash was conditioned with steam under atmospheric pressure, the different formulations required different temperatures for proper cooking. This resulted in temperatures of the mash exiting from the conditioner varying from 70° to 212° (the maximum attainable) and an added moisture variation of from 0 to 8% (or a total moisture in the mash from 7 to 18%). Therefore, conditioning of the mash for pelleting has been an art as contrasted to a science — and one which has been difficult to master because of the varied demands of temperature and moisture required by each of the formula combinations of ingredients.

According to the prior art, after the mash had been conditioned, i.e., cooked and/or moisturized at atmospheric pressure, it was introduced into a pellet mill. Pellet mills normally have employed a rotating annular die into which the mash is introduced axially and forced under the action of stationary, idler rollers through a plurality of die orifices. Thus, the mash, under atmospheric pressure, was subjected essentially to a tangential force relative to the movement of the annular die. The conditioned mash traveled at different velocities causing the high velocity, coarse particle mash to be at the lagging side of the die orifice and the slow moving, fine particle mash at the leading side. The high velocity of the mash at the lagging side resulted in poor particle adherence, evidenced by fractures in the issuing square or round rods — the die output being transversely severed to form round pellets or cubes.

According to the invention, the conditioned or cooking of the mash is achieved at a controlled steam pressure above atmospheric which results in a number of advantages. Not only does it eliminate the guesswork heretofore characteristic of the conditioning step but it results in a mash which is deaerated and considerably more plastic making it possible for the roll and die of the pellet mill to achieve a better "bite", thereby changing the through-put of the ingredients through the die orifices. The results in achieving a substantially uniform consistency across any transverse plane and substantially eliminates the heretofore disadvantageous fractures along the lagging side of the pellet rods.

Other advantages and objects of the invention may be seen in the details of the ensuing specification.

DETAILED DESCRIPTION

The invention is described in conjunction with the accompanying drawing, in which FIG. 1 is an elevational view, partially in section and partially schematic showing apparatus employed in the practice of the invention;

FIG. 2 is an enlarged fragmentary perspective view of the interior of the pellet mill annular ring seen in the lower left hand portion of FIG. 1;

FIG. 3 is a side elevational view of a 11/64 inch diameter pellet or rod portion produced according to the prior art procedure; and FIG. 4 is a view similar to FIG. 3 but showing a 11/64 inch pellet rod produced according to the teachings of this invention.

In the illustration given, and with reference to FIG. 1, mash (so indicated), is fed through a hopper 10 into a variable speed feeder generally designated 11. The mash is advanced to the right (in the illustration given) in a plug-type flow developed by a pressure seal member 12. The seal member 12 may advantageously be of the positionable cone variety as described in detail in U.S. Pat. No. 3,246,594. By the variable screw feeder 11 pushing the mash against the pressure seal 12, a solid plug of mash is developed in the seal area 13. The conical element of the seal 12 rotates and is equipped with projections or breaker bars which granulate the plug of mash into small particles so that each particle can be wetted.

Thereafter, the mash particles enter the conditioner generally designated 14 wherein the mash particles are subjected to a super atmospheric pressure schematically represented by the introduction of steam. During this phase of the conditioning, the super atmospheric pressure is maintained through the provision of a second seal 15, this being at the end of another variable screw feeder 16. Between the seals 12 and 15, the mash is advanced and tumbled by means of a paddle mixer conveyor 17 and the variable screw feeder 16. Controlled escape of air is achieved at 14a which results in the mash being substantially deaerated. An adjustable valve or similar regulatable device communicates with the atmosphere so that the air driven out of the mash particles by the steam has a place to escape. The mash therefore is cooked through and deaerated prior to pelletizing.

After the conditioned mash proceeds beyond the second sealed area 18 (developed by the conical element of the seal 15), it is particulated again by breaker bars provided on the rotating conical element of the seal 15 and flows down a chute or spout 19 to a paddle feeder chamber 20. In the chamber 20 the paddle feeder 20a advances the mash particles generally axially into the pellet mill generally designated 21. The chute 19 and chamber 20 are at atmospheric pressure as represented by the arrow 19a — any steam pressure being reduced by leakage through cracks around access or inspection doors and the like.

As can be appreciated from a comparison of the lower left hand portion of FIG. 1, and a further consideration of FIG. 2, the active elements of the pellet mill include a rotatable mounted annular die 22 which is equipped with a plurality of orifices or passages 23. Internally of the rotatable die 22 a plurality of idler rolls 24 are provided which are turned by virtue of frictional engagement with the interior of the annular die 22 and serve to force the mash through the orifices 23.

Power for rotating the die 22 is transmitted by means of a gear 25 from a motor (not shown) whereas power for turning the paddle feeder is provided by a motor 26 through a belt drive 27. This portion of the apparatus, i.e., the paddle feeder and pellet mill is commercially available from a number of different sources such as Sprout-Waldron & Company, Inc. of Muncy, Pa; California Pellet Mill Company of San Francisco, Calif.; and Landers Machine Company of Fort Worth, Tex.

The rods or ribbon-like streams issuing from the orifices 23 are transversely severed by knives or like shearing elements (not shown) into pellets of discrete length. An embodiment of a pellet made according to the instant invention is illustrated in FIG. 4 which is seen to be well knit or integrated as exemplified by the absence of fractures or cracks such as is found at 28 in the prior art pellet shown in FIG. 3.

PRIOR ART METHOD

As mentioned previously, mash of a particular formulation was fed into an atmospheric conditioner by a variable screw feeder such as that designated by the numeral 11 in FIG. 1. The screw feeder was designed to feed the desired amount of mash to the atmospheric conditioner at a constant rate. Because each formula usually required a different rate of mash advance, the conditioner was made up as a mixer with different speeds (usually 50–600 rpm) and with different holding capacities. The conditioner served as a condenser in which the cold mash caused the steam to condense whereby the temperature and moisture content of the mash was raised. Normally, steam was fed into the container through a series of steam jets. Since the conditioner was open and not sealed, the conditioning was done at atmospheric pressure and 212° was the top temperature that could be reached. The moisture addition depended upon the temperature of the mash entering the conditioner chamber and the exiting temperature of the mash required for the pelleting. According to the prior art, each formula required a different temperature of the mash from the conditioner, such mash temperatures varying from 70° to 212° F. with an added moisture variation of from 0 to 8% or a total moisture in the mash of from 7 to 18%.

As indicated previously with respect to the pellet mill 21, the rolls 24 were turned by the friction of the annular die 22. Due to the rolls 24 being tight enough against the interior cylindrical wall of the annular die 22 to cause the roll 24 to turn, a biting effect was created which pushed the conditioned mash through the orifices 23. The action of the rolls 24 against the annular die 22 resulted both passing the mash through the orifices 23 to produce the pellet ribbons and simultaneously, a reciprocating action, i.e., in and out of the orifices 23 to cause an attrition of the mash particles. Normally, the die 22 was rotated but at different speeds of the different designs of machinery, and the different resistances encountered in the various dies and the different shapes and sizes of finished pellets, the normal range of speeds being from 100 to 400 rpm.

In the prior art, the conditioned mash traveled at different velocities because of the interaction of the rolls 24 and the interior cylindrical wall of the annular die 22, the high velocity, coarse particle mash appearing at the lagging or rear side of the orifices 23 as each passes a given point because of the rotation of the die 22. On the other hand, the slow moving, fine particle mash appeared at the leading or front side of each orifice. The high velocity mash resulted in particles being less adherent, resulting in fractures 28 which caused pellets generated therefrom to fall apart and become fines. Also, coarse particles as at 29 were much more prevalent.

INVENTIVE METHOD

According to the inventive procedure, the mash is conditioned in a super atmospheric chamber defined at the ends thereof by the seals 12 and 15. These concical seals serve to arrest the flow of mash so as to develop a plug of discrete length (in the direction of mash flow) and which is abraded by suitable projections on the rotating conical seal members 12 and 15.

The conditioning is advantageously achieved by steam under pressure of from about 1 psi to about 14 psi. By pressure cooking the mash, the mash particles are cooked substantially throughout (and deaerated) and can be achieved in a period of as little as about 10 seconds particle residence time in the conditioner between the seals 12 and 15. As the pressure cooked conditioned mass issues from the seal 15 into the atmospheric pressure down spout 19, the mash is deaerated, soft, sticky, hot and wet. As it enters into the roll and die area of the pellet mill 21, a better bite of the mash is achieved and the tangential forces are more effective in forcing the mash through the orifices 23, particularly as a homogeneous unit (or material having a substantially uniform consistency across each successive transverse section). This applies to a wide range of pellet sizes. Normally the pellets which result from a square cross section orifice are designated cakes and are popularly of the order of ¾ inch to 1¼ inch on a side. Similar diameter dimensions are achievable using circular cross section orifices.

Further, I have found that the inventive conditioning of the pellets results in the pellets being less fragile even without the use of binding agents. This is advantageous in reducing the cost of the animal feed pellets and permits the use of the money heretofore spent on binders and the like for more nutritional ingredients. In addition, more efficient use is made of the power needed to advance the mash through the conditioner — pellet mill combination. It will be appreciated that the power for rotating the annular die 22 is a quite expensive form of power, i.e., electricity, as contrasted to the relatively cheaper power provided in the form of steam to the conditioner. Thus, it is additionally advantageous to utilize the pressure cooking principle in that not only is a superior product achieved, but at less power cost.

Although the mechanism by which the invention operates is imperfectly understood, it is believed that there is a significant difference in the bite area between the rolls 24 and the interior cylindrical surface of the die 22. With the atmospheric-conditioned mash, the individual particles were cooked primarily on the outer surface causing the interior of the surface to remain hard and also retain entrapped air. This type of particle could not be trapped easily between the roll and die, causing the mash to be forced in and out of the die orifices resulting in an abrading action of the ingredients, requiring extra power. The mash could travel this in and out path a number of times until trapped and able to overcome the resistance created by the length of the orifice. Because of the different resistances in different sections of the walls of the orifices 23, the mash traveled at different velocities and thereby created different degrees of compaction and adherence along the length and at different side segments of the pellet ribbon rod. This resulted in non-uniform quality and a tendency to fracture and generate fines.

On the other hand, with the cooking or conditioning at super atmospheric pressure, binders heretofore deemed necessary can be eliminated and replaced by such important and advantageous ingredients such as fat, urea and other important nutritional agents. Further, because of the more plastic nature of the deaerated mash resulting from pressure cooking, these advantageous ingredients are able to penetrate beyond the surface of the mash particles, taking the place of the released air.

Further, when the cooking was performed at atmospheric pressure according to the prior art, operators of pellet mills were forced to cook different feed formulas as different temperatures and moisture. Each formula had a prescribed amount of moisture and heat added by steam which, if exceeded, would cause plugging. If not enough steam were added, excessive power was required in the pellet mill or the output rate reduced. According to the inventive procedure, it is possible to pellet each formula at the same steam pressure resulting in a mash of uniform consistency irrespective of formulation — because of the combination of cooking throughout and deaeration. This makes the operation much more readily amenable to automation and reduces the need for special equipment and knowhow.

I claim:

1. In a method of preparing animal food pellets wherein cooked mash under atmospheric pressure is forced through a die, the steps of cooking said mash under superatmospheric pressure, reducing the pressure on said mash to atmospheric, radially forcing said mash through orifices of a rotating die to form deaerated rods of substantialy uniform consistency across successive transverse planes and characterized by the substantial absence of fractures on the lagging side of the rod and thereafter transversely severing the rods to form pellets.

2. The method of claim 1 in which said cooking step is performed by confining the mash in a steam atmosphere in the range of about 1 psi (gauge) to about 14 psi (gauge).

* * * * *